(12) United States Patent
Staedler et al.

(10) Patent No.: US 7,802,469 B2
(45) Date of Patent: Sep. 28, 2010

(54) MEASUREMENT METHOD FOR BRAKES IN WIND TURBINES

(75) Inventors: Martin Staedler, Berlin (DE); Frank Hinken, Rheine (DE)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 12/044,078

(22) Filed: Mar. 7, 2008

(65) Prior Publication Data

US 2009/0223307 A1 Sep. 10, 2009

(51) Int. Cl.
*G01P 13/00* (2006.01)

(52) U.S. Cl. .................. 73/170.01; 73/170.11
(58) Field of Classification Search ........................ None
See application file for complete search history.

(56) References Cited

U.S. PATENT DOCUMENTS

2009/0162202 A1* 6/2009 Nies et al. .................. 416/147

* cited by examiner

*Primary Examiner*—Lisa M Caputo
*Assistant Examiner*—Jermaine Jenkins
(74) *Attorney, Agent, or Firm*—Global Patent Operation; Douglas D. Zhang

(57) ABSTRACT

A method for testing the brakes of a wind energy system is provided, wherein the method comprising determining the brake torque by an indirect measurement. The method contains a comparison to defined threshold values for time and generator torque as well as time and actual power. Further, a computer-readable medium is provided that provides instructions which when executed by a computing platform cause the computing platform to perform operations wherein the operations include the method according to embodiments described herein. Further, a wind energy system is provided that has a rotor with a rotor brake and a calculation unit adapted for comparing two threshold values for time and torque to the actual values of time and torque, alternatively for comparing two threshold values for time and actual power to the actual values of time and actual power.

19 Claims, 6 Drawing Sheets

MEASUREMENT METHOD FOR BRAKES IN WIND TURBINES

FIELD OF THE INVENTION

The present invention relates to a wind energy system and to a measurement method of the functionality of a wind energy system. The present invention relates particularly to a measurement of the functionality of the brake in a wind turbine. The present invention further relates to a wind energy system including the same.

BACKGROUND OF THE INVENTION

Wind power has attracted much attention during recent years as an alternative source of energy. Wind turbines are used to convert kinetic wind energy into electric power. For this purpose, utility-class wind turbines have wind rotors which are usually equipped with three rotor blades to extract kinetic energy from the wind. Nevertheless, it must be possible to keep the rotor of a wind turbine in position when it is at a standstill. Arresting the rotor is important for servicing and repair. Apart from the necessity to lock the rotor, it is also necessary to reduce the rotor speed at least within a certain range by means of a mechanical brake. This is commonly realized by disc-breaks. For safety reasons, the functioning of the brakes has to be tested within predetermined time intervals during the operation of the wind turbine.

For testing the brakes as known in the art, a switch off of the wind turbine is necessary. This means a down time for the turbine and a decrease of the energy yield.

BRIEF DESCRIPTION OF THE INVENTION

In view of the above, a method of measuring the functionality of a brake of a wind energy system is provided comprising determining the brake torque.

According to embodiments described herein, a method is provided including determining the brake torque by measuring the generator torque.

According to embodiments described herein, a method is provided including determining the brake torque by measuring the actual power.

According to a further aspect, a computer-readable medium is provided that provides instructions which when executed by a computing platform cause the mentioned computing platform to perform operations wherein the operations include the method according to embodiments described herein.

According to a further aspect, a wind energy system is provided having a rotor with a rotor brake and a calculation unit adapted for comparing a time threshold value with a measured time value and a torque threshold value with a measured torque value. Alternatively to comparing a torque threshold value with the measured torque value, a power value can be compared to a measured power value.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

According to a first aspect of the invention, an indirect method of testing the disc brake includes operating a wind turbine, applying a rotor break, and measuring the applied torque. The method may further include, at a given state of the operating wind turbine, the appointment of typically two parameters whereas one parameter is typically a value of the generator torque and the other parameter is typically a value for the time. The state of the wind turbine is typically given by information on the power level, the fluctuation of the average power, the fluctuation of the wind speed and the pitch angle.

According to a further aspect of the present invention, the method for testing the brakes includes operating a wind turbine, applying a rotor brake, and measuring the actual power. The method further may further include, at a given state of the operating wind turbine, the appointment of typically two parameters, whereas one parameter is a value of the generator torque and the other parameter is typically a value for the time. The state of the wind turbine is typically given by information on the power level, the fluctuation of average power, the fluctuation of wind speed and the pitch angle.

The method according to embodiments described herein gives information on the state of the brake by measuring the torque. When applying the disc-brake, the speed controller set point will be set to actual speed. Typically, the torque limits are released. This may be necessary, for instance, in those wind energy systems where the controller implementation comprises a limit for low torques. The measurement of the reduction of the generator-torque allows an indirect measurement of the torque applied by the disk brake. When the generator-torque is reduced to below a threshold value within a certain time, the brake is OK. According to typical embodiments, the torque threshold value is non-zero. Similarly, in those embodiments where the power generated by the generator is measured, the power threshold value is typically non-zero.

Figure 1:
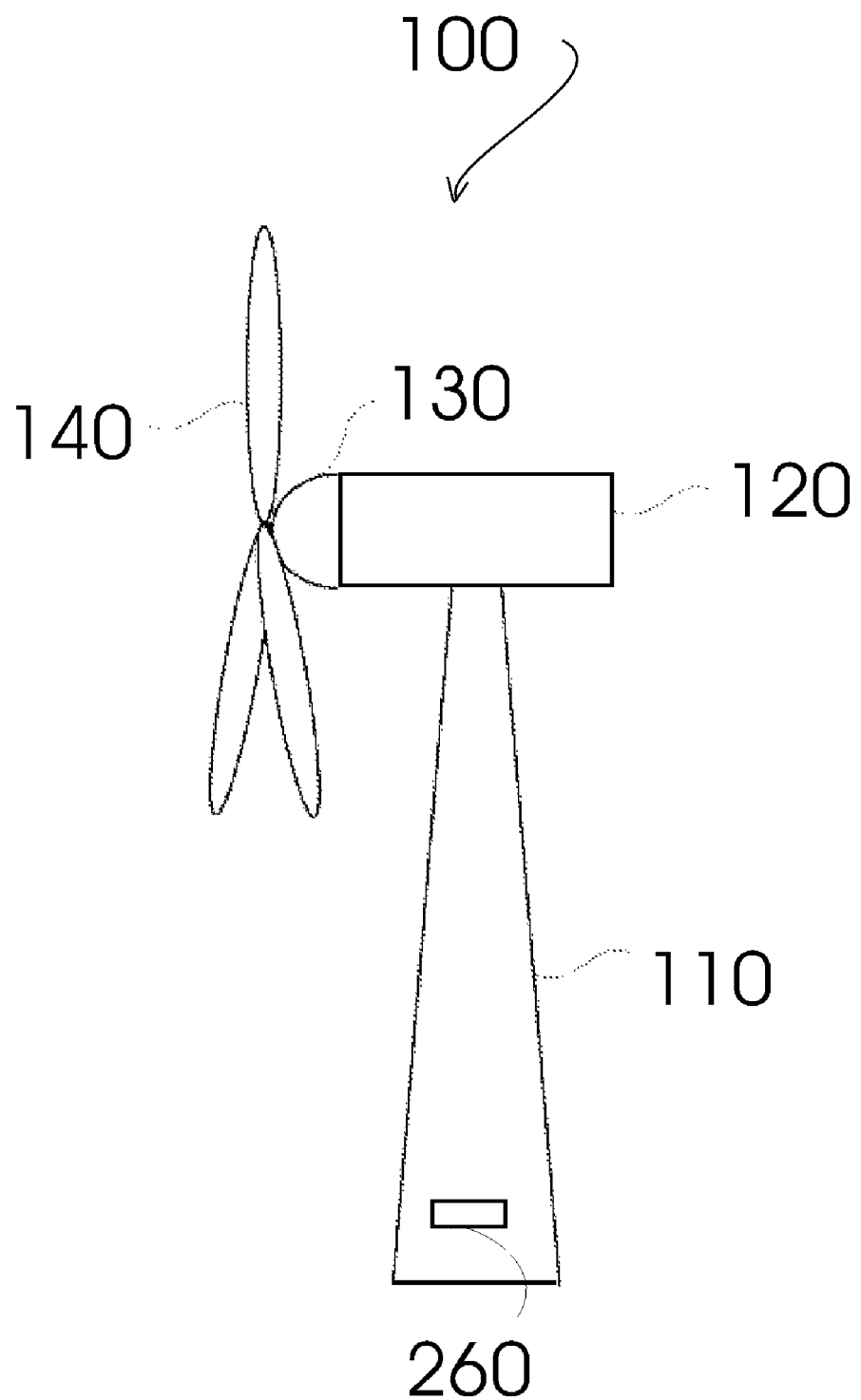
FIG. 1 shows a schematic side view of a wind energy system according to embodiments described herein.

FIG. 1 is a schematic cross-sectional side-view of a wind turbine. The wind turbine 100 has a tower 110 to which the nacelle 120 is mounted at its top end. The expression "wind turbine" in this description is used synonymously to the expression "wind energy system". The nacelle houses a drive train (shown in FIG. 2) to which an electric generator is connected (shown in FIG. 2). A hub 130 bearing three rotor blades 140 is mounted to a lateral end of the machine nacelle 120. The rotor blades 140 can be adjusted by pitch drives which are typically accommodated inside the hub 130. Further, a calculation unit 260 is exemplarily depicted in FIG. 1. Typically, the calculation unit is situated at the bottom of the wind energy system, in typical embodiments along with the control unit of the wind energy system. The calculation unit serves the comparison between measured values and predetermined threshold values according to embodiments described herein and will be explained in more detail below.

Figure 2:
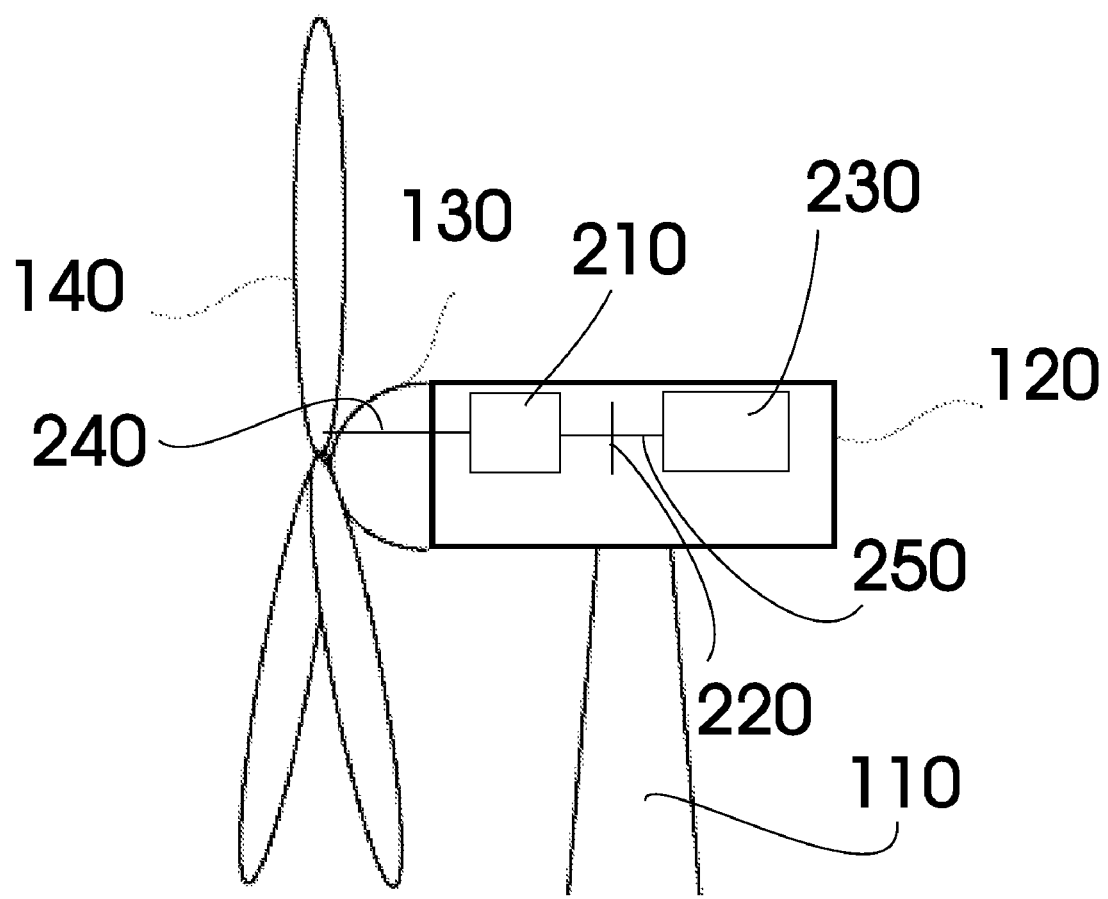
FIG. 2 shows a more detailed schematic side view of the top of a wind energy system according to embodiments described herein.

FIG. 2 shows a more detailed view of the top of the wind turbine 100 according to embodiments described herein. The nacelle 120 houses a drive train containing the rotor hub 130, the rotor shaft 240, the gearbox 210 and the generator driveshaft 250. The output of the gearbox 210 is connected to a main electric generator 230. According to other embodiments, the gearbox is omitted and the rotor shaft 240 is directly connected to the generator. Between rotor hub 130 and generator 230 a rotor brake 220 is installed. Typically, the rotor brake 220 is installed between the gearbox 210 and generator 230. According to other embodiments, the rotor brake 220 is located in front of the gearbox 210 on the rotor shaft 240. The rotor brake can e.g. be a disc brake or a belt brake. The rotor brake is adapted for braking the rotor shaft. Typically, braking is undertaken mechanically.

The rotor brake has several functions. One application of the brake is during standstill. The brake works typically as a parking brake during periods of servicing and repair. The rotor brake can also be used as an operating brake. Hence, the mechanical rotor brake can be used as a second independent braking system in addition to aerodynamic rotor braking.

In order to assure that the safety concept comprising the rotor brake is working, the brake has to be tested. This is typically done in predetermined time-intervals such as annually or monthly. A standard procedure for testing makes the results of the testing reproducible and reliable.

Figure 3:
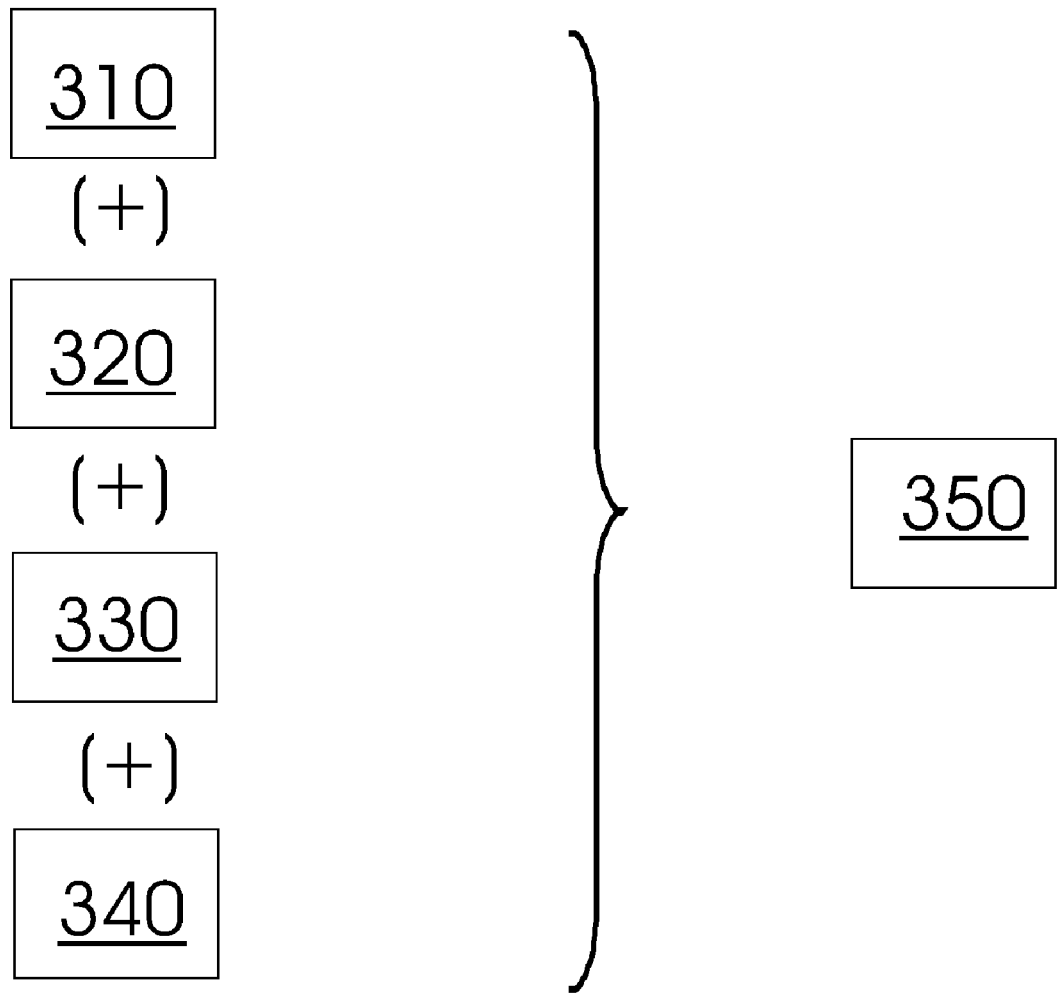
FIG. 3 shows a diagram illustrating conditions for the brake test according to embodiments described herein.

According to embodiments described herein, several conditions may be relevant for the test of the disc brake. In the following, four conditions will be explained in more detail that can be relevant for the test. A schematic drawing of these conditions is shown in FIG. 3. One or more conditions shown in FIG. 3 should be fulfilled in order to start the test. This is indicated by the plus signs in brackets in FIG. 3. According to some embodiments, the test is started only if all four of the conditions are fulfilled.

The first condition 310 relates to the actual power. The power level of the wind energy system should be between 0.4 and 1.2 multiplied with the rated power, typically between 0.6 and 1.0 multiplied with the rated power. This ensures that the wind turbine operates accurately which is necessary for the correct function of the brake test. The term "rated power" in this context should be understood as a power level at which the energy yield reaches its maximum. The rated power depends strongly on the rotor diameter.

The second condition 320 is about the fluctuation of the average power. The term "fluctuation" in this context refers to a variation in a certain quantity, e.g. the power or the wind speed, from its spatial or temporal average. More mathematically, the term fluctuation refers to the standard deviation relating to the rated power. This fluctuation must be less than typically 30%, more typically 20% and even more typically 10% within a predetermined time interval such as typically within the last 15 min, more typically within the last 10 min. It is desirable for the correct measurement that there are nearly constant conditions. Further, the conditions should be about the same with every brake test.

The third condition 330 relates to the fluctuation of the wind speed. This fluctuation has to be less than a predetermined value which is typically 30%, more typically 20% and even more typically 10% over the last typically 15 min, more typically over the last 10 min. For secure and proper functioning of the brake it is desirable that the wind speed condition is rather constant.

Another condition 340 is related to the pitch angle. The pitch angle control allows a sensible and stable control of aerodynamic power capture and rotor speed. As the average power should be constant within a range, 320, the wind speed should be constant too because the power depends on the wind speed. The pitch angle should be constant as the power level is typically below rated power in this operating range.

According to embodiments described herein, the test 350 of the disc brake is typically started when one or more of the conditions described above are fulfilled. According to other embodiments described herein, the test 350 of the disc brake is typically started when all of the conditions described above are fulfilled.

Figure 4A:
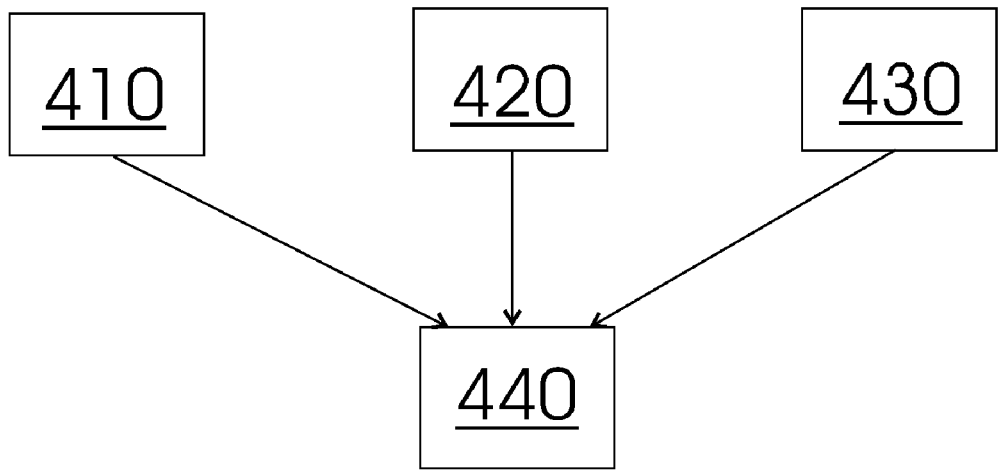
FIG. 4a shows a diagram illustrating the method of the brake test according to embodiments described herein.
Figure 4B:
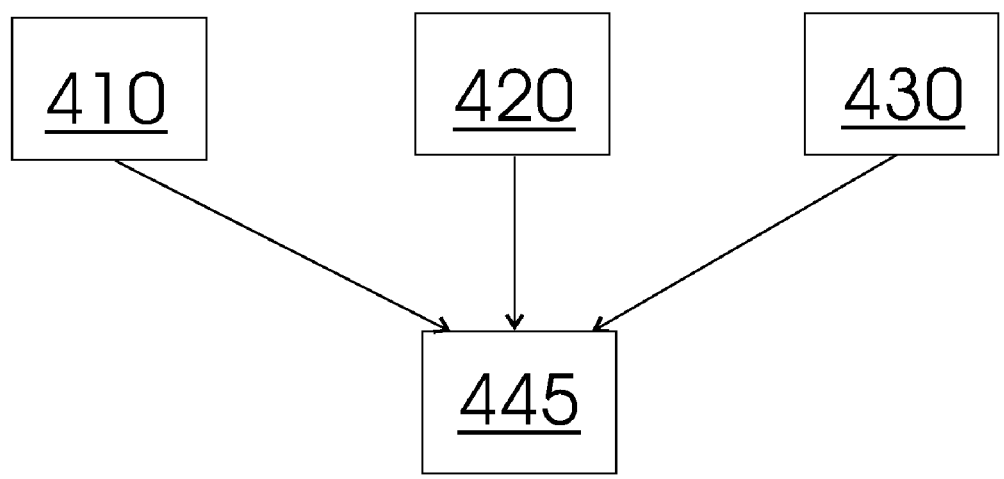
FIG. 4b shows another diagram illustrating the method of the brake test according to embodiments described herein.

The steps for conducting the brake test are shown in FIGS. 4a and 4b according to two different embodiments described herein. During operation of the wind turbine, the brake to be tested is applied in step 410. Instead of beginning the test at a very low power-level, as it is necessary in the state of the art, the power-level can be held at an efficient state while starting to apply the brake. As an additional benefit, this ensures also that the brake is working not only on low power levels, but also at higher power levels. The test reveals significant results and the power yield stays in an acceptable range during the test.

When applying the disc brake, the speed controller set point is set to actual speed in step 420. Meanwhile, the torque-limits of the generator are released in step 430. Typically, the setting of the speed controller set point to the actual speed and releasing the torque-limits is undertaken synchronously. It is possible to regulate rotor speed and power output by use of the control variable "generator torque" which is common in most of the large wind turbines. As the torque limits are released and the speed controller is set, the generator torque and, consequently, the actual power yield changes.

When the steps described in reference to the numbers 410, 420 and 430 are completed, the generator torque is measured. In the event of a functioning brake, a reduction of the generator torque will be detected (step 440). The reduction of the generator torque refers to the torque exerted by the brake.

According to other embodiments described herein, as shown in FIG. 4b, if the steps described with reference to the numbers 410, 420 and 430 are completed, the actual power generated by the generator is measured. In the event of a functioning brake, a reduction of the actual power will be detected (step 445). By measuring the reduction of the actual power, conclusions on the functioning of the brake can be made. This is typically done by calculating the change in the torque of the generator and/or the brake.

Figure 5A:
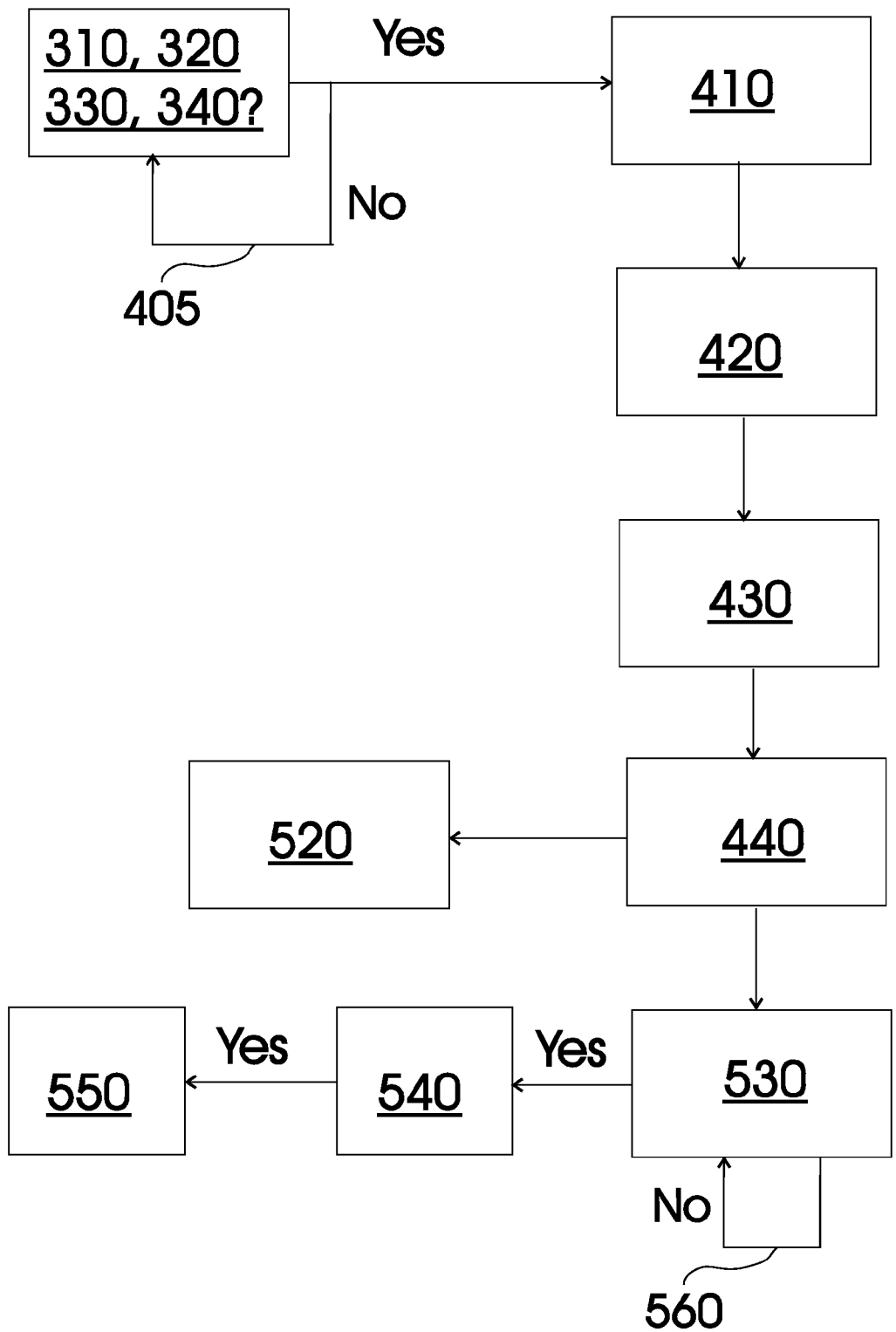
FIG. 5a shows a flow diagram of the method of testing the brake according to embodiments described herein.

The flow diagram of the method of the test for the functionality of the rotor brake according to embodiments described herein is shown in FIG. 5a. First of all, as mentioned above, one or more of the conditions 310, 320, 330 and 340 should be fulfilled for starting the test. If none of the conditions is fulfilled, it is typical that the test is postponed until one or more of the conditions are met. In order to do so, it is typically checked in predetermined time intervals or continuously whether the conditions are fulfilled. This is indicated by the arrow denoted with the reference sign 405.

According to embodiments described herein, the brake to be tested 410 can be applied. The speed controller set point is set to actual speed in step 420. Meanwhile, the torque-limits of the generator are released in step 430. The generator torque is measured and a reduction of the generator torque should be determined in step 440. According to embodiments described in FIG. 5b, not the generator torque, but the actual power is measured in step 445. A conclusion on the torque applied by the brake can be made in step 520 from the value of the actual generator torque (embodiment according to FIG. 5a) or from the value of the measured actual power (embodiment according to FIG. 5b). This might be beneficial in that the value of the brake torque can be compared with the values of other brakes. This allows, for instance, a statistics on a significant number of brakes.

The determined value of the generator torque is typically compared with a predetermined threshold value, as it is shown in step 530 of the embodiment described with respect to FIG. 5. The comparison is undertaken by a calculation unit adapted for comparing the threshold values for time and torque with the actual measured values of time and torque.

Figure 5B:
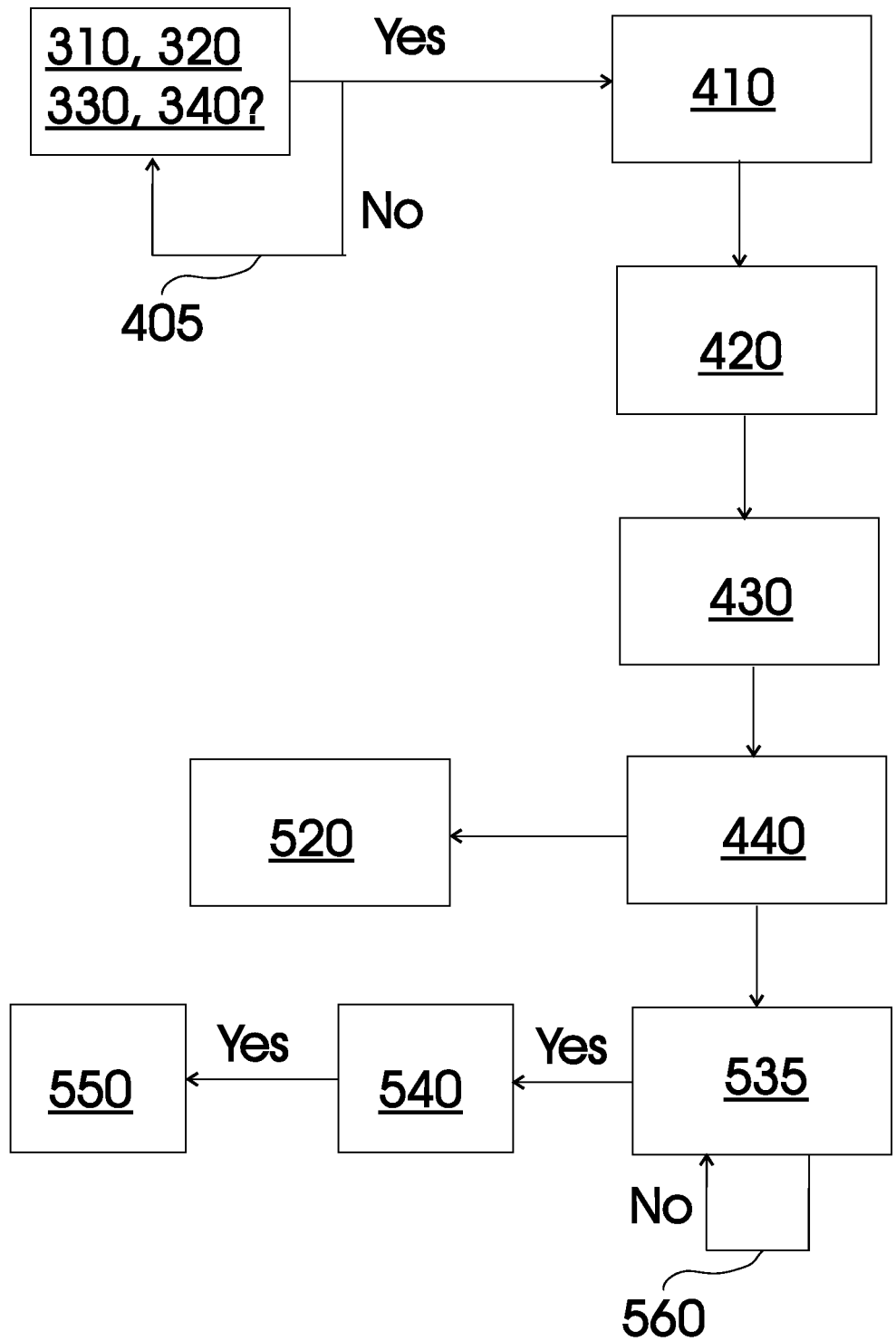
FIG. 5b shows a flow diagram of another method of testing the brake according to embodiments described herein.

According to other embodiments described herein, as illustrated in FIG. 5b, the determined value of the actual power is compared with a threshold value for the actual power 535. The comparison is undertaken by a calculation unit adapted for comparing the threshold values for time and power with the actual values of time and power.

Typically, the time is measured from the beginning of the test. Therefore, the time interval can be determined that is necessary to bring the generator torque to a certain level by applying the brake. A predetermined threshold value for the time allows a comparison to the measured time from the beginning of the test. Typical time threshold values are in the range of 10 seconds and 10 minutes, more typically between 30 seconds and 5 minutes.

Referring to the embodiments illustrated with respect to FIG. 5a, the measurement of the generator torque has to be repeated as long as the measured generator torque value is greater than the torque threshold value. This is shown by the arrow 560 indicating this loop. "The measurement is repeated" in this context refers to continuously measuring the generator torque or repeatedly measuring the generator torque after certain time intervals. Typical time intervals are between 0.1 second and 30 seconds, more typically between 1 second and 10 seconds. If the measured value of the generator torque is equal to or less than the threshold value of the generator torque, the time from the beginning of the test will be measured. The time value is compared to a predetermined time threshold value in step 540.

Referring to the embodiments illustrated with respect to FIG. 5b, the measurement of the power has to be repeated as long as the measured power value of the generator is greater than the power threshold value. This is shown by the arrow 560 indicating this loop. "The measurement is repeated" in this context refers to continuously measuring the generator torque or repeatedly measuring the generator torque after certain time intervals. Typical time intervals are between 0.1 second and 30 seconds, more typically between 1 second and 10 seconds. If the value of the measured power is equal to or less than the threshold value of the power, the time from the beginning of the test will be measured. The time value is compared to a predetermined time threshold value in step 540.

If the time value is within the range of the threshold time value, the brake is OK and the test can be terminated. If the time value exceeds the time threshold value, this might result in various consequences. According to some embodiment, the test will be repeated in order to exclude the possibility of an erroneous test instead of a malfunctioning brake. For instance, it is possible to repeat the test once or twice prior to shutting the wind energy system down and initiating servicing. According to other embodiments, the wind energy system is shut down immediately after bad test results and servicing is initiated. In general, servicing may be initiated by sending an alarm message to the operator of the wind energy system.

Typically, the test results will be displayed on an output, such as a display or a printer of a controlling unit of the wind energy system. A user, such as a serviceman, may find out all the details on the test by using an input and output of controlling unit of the wind energy system. The controlling unit may further include a storage unit, such as a hard-drive disc, in order to store details on the tests.

Typically, the comparison of the measured values with the threshold values is undertaken by a calculation unit. The calculation unit may be part of the controlling unit of the wind energy system. Further, the threshold value for the measurement of the actual power as well as that of the generator torque can be calculated by the calculation unit. The threshold values for the actual power and the generator torque depend strongly on the conditions at the beginning of the test. For instance, the threshold power value varies with the actual power at the beginning of the brake test. Since the test is typically started at a power level between 0.4 and 1.2 multiplied with the rated power, more typically between 0.6 and 1.0 multiplied with the rated power, the actual power threshold value should be determined in dependence on the measured actual power before the beginning of the test. The threshold power value is e.g. different when the test is started at 0.6 times the rated power or started at 0.9 times the rated power. The same is valid for the threshold torque value.

The threshold time value generally depends on the threshold torque value and/or the threshold power value. For instance, it refers to a certain difference between the torque value at the beginning and the torque value at measuring time. Alternatively, it might refer to a certain difference between the power value at the beginning and the power value at the measuring time. This certain difference could be, for instance, the percentage of reduction of the torque or power.

These threshold values differ from construction to construction of the wind turbines. Further, the threshold values depend on the situation, where the brake test is started, e.g. the power level, the wind speed or the like.

The wind energy system is equipped with controlling and measurement devices and sensors. For instance, the wind energy system includes a generator torque measuring device, a speed controller with the possibility of setting a speed controller set point, a pitch control and the like.

According to typical embodiments described herein, additional sensors, measurement devices or controlling devices for testing the brake torque, e.g. for safety reasons, are not necessarily required. The sensors and measurement devices necessary for carrying out the methods according to embodiments described herein are typically already provided with the wind energy system and applied for its operation. Malfunctioning of one of the measurement or controlling devices would already result in a shut-down of the turbine. If the turbine is operating, the test is reliable. Hence, the test results are highly trustworthy.

According to typical embodiments described herein, the brake is only applied until a certain value of the generator torque is reached. That is, the brake is only applied for a specific time interval. This time interval is typically between 1 second and 30 seconds, more typically between 1 second and 10 seconds, even more typically between 1 second and 5 seconds. Hence, the brake pad is not stressed very long. Furthermore, the short time of appliance decreases the torque and the thermal loading that must be absorbed by the drive train. This results in a longer life-time of the brake in the wind turbine and therefore in lower costs during the life-time of the wind turbine due to a smaller necessity of servicing and shorter repair times. Furthermore, the effect results in better operating of the drive train, as the loads that are responsible for several damages of the drive train are reduced. Rotor start-up and shut down involve special loads and load cases. These loads have an influence on the fatigue of the wind energy system. The brake test according to embodiments described herein avoids the total stop of the rotor. Having reduced these loads, the life-time of the drive train can be expected to be longer. Thereby, the using-time of the wind energy system may also be longer as a result of lower stress fluctuations.

Further, according to typical embodiments described herein, the down-time of the wind turbine will be reduced. Starting the test at a higher power level and avoiding that the generator torque has to be switched off completely by the brake, the overall energy yield increases. The energy yield is not only increased but also more constant, because the peaks of high and low yield are not that extreme as they are without the indirect method of brake testing described herein. A constant energy yield is desirable, particularly in the wind energy sector. Thus, the method of indirect measuring results in a higher efficiency of the wind turbine and a higher reliability.

The test method for brakes in a wind energy system as described herein can be beneficial to the life-time of the wind turbine. Due to the shorter time-interval in comparison to tests known in the art and due to the reduction of the generator torque to a typically non-zero threshold value, the force applied from the brake using the indirect measuring test is smaller than using known tests. Thus, the loads in the drive train will be reduced. For instance, when the brake is used until the standstill of the rotor, the maximum appearing loads are inevitably bigger than when the brake has only to reduce the generator torque at some percentage. The effect will save costs and material.

According to typical embodiments described herein, the method of indirectly measuring the brake's quality causes less erroneous detection of outworn brake pads. The exchange of a probably outworn brake pad generates not only costs during the standstill and costs for the new brake pad but also man power costs for changing the brake pad.

As one step of embodiments described herein is setting the speed controller set point to the actual speed, the wind speed and a moderate changing of the wind speed, such as within up to 30% of the wind speed, does not influence the test of the brake.

The method of testing the rotor brake of a wind energy system described herein allows determining of the torque applied by the brake. This can be calculated from the information given by the measured generator torque or the measured actual power. Typically, it can be assumed that—provided that the torque extracted from the wind remains unchanged—the sum of generator torque and break torque is constant. Hence, under these conditions, the reduction of the torque in the generator refers to an increase of the torque in the brake at the identical absolute value. Thus, by measuring the generator torque, an evaluation of the torque applied by the brake is possible and a conclusion on the functioning of the brake can be made. The information of the functionality of the brake allows a conclusion on the quality and the operability of the rotor brake.

According to typical embodiments described herein, a wind energy system is provided that includes a rotor with a rotor brake. Furthermore, a calculation unit adapted for comparing two threshold values with actual values is provided. These values serve for a test of the rotor brake. One threshold value is a torque threshold value, which is compared to a measured torque value, or a power threshold value, which is compared to a measured power value. The other value is typically a time threshold value that is compared to a measured time value.

With the application of the brake, the application of the speed controller and the step of releasing the torque limits, the generator torque will be reduced. This reduction takes place within a certain time interval. Comparing the threshold values for the torque, alternatively the actual power, and the threshold values for the time with the actual values of these parameters, a conclusion can be made on the functionality of the brake.

According to typical embodiments described herein, the calculation unit is fed by a computer-readable medium which includes the information the calculation unit needs to execute the above described method step. Typically, the calculation unit determines the threshold values for time and torque. According to embodiments described herein, the calculation unit calculates the threshold values for actual power and time. The calculation unit is adapted for comparing the threshold values with measured values.

Furthermore, the computer-readable medium includes information about the determination of the two threshold values, which are defined in advance and in dependence of the situation where the test is started. For instance, the threshold value of the generator torque, at which the test will be finished, is dependent from the fact if the rotor brake test is started at a power level of 0.6 times the rated power or at a power level of 1.0 times the rated power.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of measuring the functionality of a brake of a wind energy system, the wind energy system comprising a generator which is different from the brake, said method comprising:
    applying the brake; and
    determining a brake torque of the applied brake to measure a functionality of the brake.

2. The method according to claim 1, wherein determining the brake torque is undertaken by measuring a torque of the generator.

3. The method according to claim 1, wherein determining the brake torque is undertaken by measuring an actual power of the wind energy system.

4. The method according to claim 1, wherein the brake is a rotor brake.

5. The method according to claim 4, wherein the rotor brake is a disc brake.

6. The method according to claim 4, wherein the rotor brake is a belt brake.

7. The method according to claim 1, further comprising setting a speed controller set point to an actual operational speed of the wind energy system.

8. The method according to claim 1, wherein a torque limit of the generator is released when applying the brake.

9. The method according to claim 1, wherein the determining step comprises determining at least one of a power level of the wind energy system, a fluctuation value of power of the wind energy system, a fluctuation value of wind speed, and a fluctuation value of a pitch angle of a rotor blade of the wind energy system.

10. The method according to claim 9, wherein prior to applying the brake one or more of the following conditions are met:
   the power level being between 0.4 and 1.2 times rated power of the wind energy system;
   the fluctuation value of the power over a predetermined time interval being less than 30%;
   the fluctuation value of wind speed over a predetermined time interval being less than 30%; and
   the fluctuation value of the pitch angle being zero.

11. The method according to claim 10, wherein the predetermined time interval is between 5 and 15 minutes.

12. The method according to claim 1, wherein a torque of the generator is reduced, measured and compared to a torque threshold value.

13. The method according to claim 12 wherein a time until the torque reaches the torque threshold value is measured and compared to a time threshold value.

14. The method according to claim 12, where the torque threshold value is calculated by a calculation unit prior to applying the brake based on operating conditions of the wind energy system prior to applying the brake.

15. The method according to claim 1, wherein a power of the wind energy system is reduced, measured and compared to a power threshold value.

16. The method according to claim 15, wherein a time until the power reaches the power threshold value is measured and compared to a time threshold value.

17. The method according to claim 15, where the power threshold value is calculated by a calculation unit prior to applying the brake based on operating conditions of the wind energy system prior to applying the brake.

18. A computer-readable medium that provides instructions which when executed by a computing platform cause said computing platform to perform operations, said operations comprising the method according to claim 1.

19. A wind energy system comprising:
   a rotor with at least one rotor blade;
   a rotor brake for braking the rotor;
   a generator operatively driven by the rotor, the generator being different from the rotor brake; and
   a calculation unit configured to compare a measured parameter value with a threshold parameter value for determining a brake torque of the rotor brake after the rotor brake is applied, wherein the parameter is from the group consisting of torque of the generator, power of the wind energy system, and time.

* * * * *

UNITED STATES PATENT AND TRADEMARK OFFICE
CERTIFICATE OF CORRECTION

| | | |
|---|---|---|
| PATENT NO. | : 7,802,469 B2 | Page 1 of 1 |
| APPLICATION NO. | : 12/044078 | |
| DATED | : September 28, 2010 | |
| INVENTOR(S) | : Staedler et al. | |

It is certified that error appears in the above-identified patent and that said Letters Patent is hereby corrected as shown below:

In Column 10, Line 1, in Claim 14, delete "where" and insert -- wherein --, therefor.

In Column 10, Line 11, in Claim 17, delete "where" and insert -- wherein --, therefor.

Signed and Sealed this
First Day of February, 2011

David J. Kappos
*Director of the United States Patent and Trademark Office*